United States Patent [19]

Shead et al.

[11] Patent Number: 5,049,216

[45] Date of Patent: Sep. 17, 1991

[54] WARP CONTROL APPARATUS AND METHOD FOR SHEET MATERIAL

[75] Inventors: Ray S. Shead, Sevenoaks, England; Leonard M. Anderson, San Jose, Calif.

[73] Assignee: Measurex Corporation, Cupertino, Calif.

[21] Appl. No.: 359,855

[22] Filed: May 31, 1989

[51] Int. Cl.⁵ .............................................. B32B 31/00
[52] U.S. Cl. ..................................... 156/64; 156/208; 156/210; 156/351; 156/356; 156/378; 364/471; 73/73
[58] Field of Search .................. 162/198, 263, DIG. 6; 156/64, 351, 356, 378, 210, 208, 205; 73/73; 364/471

[56] References Cited

U.S. PATENT DOCUMENTS

| | | | |
|---|---|---|---|
| 3,793,524 | 2/1974 | Howarth | 250/339 |
| 3,879,607 | 4/1975 | Bjorklund | 250/252 |
| 3,981,758 | 9/1976 | Thayer et al. | 156/64 |
| 4,134,781 | 1/1979 | Carstens et al. | 156/64 |
| 4,306,151 | 12/1981 | Chase | 250/341 |
| 4,314,868 | 2/1982 | Hirakawa et al. | 156/207 |
| 4,345,962 | 8/1982 | Cowley et al. | 156/51 X |
| 4,497,027 | 1/1985 | McGuire et al. | 156/64 X |
| 4,733,078 | 3/1988 | Sturm | 250/339 |

Primary Examiner—David A. Simmons
Assistant Examiner—Thi Dang
Attorney, Agent, or Firm—Spensley Horn Jubas & Lubitz

[57] ABSTRACT

The apparatus and method of the present invention provide means by which non-warped corrugated paperboard sheet may easily and consistently be produced. The cross-directional moisture content profiles of the top and bottom liners of the corrugated sheet are automatically monitored, and controlled with independently operable water jets such that the liners have approximately equal machine and cross-direction moisture content profiles. The moisture content profiles of the liners are controlled to equalize the machine direction and cross-directional stresses created within the liners as they dry out, thereby producing non-warped corrugated paperboard sheet.

18 Claims, 4 Drawing Sheets

FIG. 3

WARP CONTROL APPARATUS AND METHOD FOR SHEET MATERIAL

BACKGROUND OF THE INVENTION

The present invention is directed to an apparatus and method for controlling the flatness or warping of sheet material. More particularly, one embodiment of the present invention utilizes infrared reflectance-type moisture sensors to measure the cross-directional moisture content profiles of the two outer paper sheet liners of a corrugated paperboard sheet. The device then controls the moisture content profiles of the liners based upon these moisture measurements, to thereby control the warping of the sheet.

The manufacture of corrugated paperboard sheet requires the bonding together of three components: a top liner, a corrugated medium and a bottom liner. The top and bottom liners are typically heavy sheets of paper (e.g., cardboard), and the corrugated medium is typically also sheet paper, but usually of lighter weight. In a typical manufacturing process, the corrugated medium is first bonded by gluing to the top liner. The bonded top liner and corrugated medium then pass through a heated chamber called a "single facer." The elevated temperature within the single facer dries the glue, thereby firmly securing the corrugated medium to the top liner. The bottom liner is then glued to the exposed side of the corrugated medium, and the three-component sheet passes through a second heated chamber, called a "double facer." The elevated temperature within the double facer dries the glue holding the corrugated medium to the bottom liner so that the three components of the corrugated paperboard sheet, i.e., the top and bottom liners and the corrugated medium, are now firmly bonded together.

Ideally, once these three components have been bonded together, the resulting corrugated paperboard sheet should then have, and thereafter continue to have, equal or balanced stresses within the top and bottom liners. Having such balanced stresses will result in a non-warped sheet, since the stresses in the top liner will exactly cancel the stresses in the bottom liner. However, without some external influence over the factors tending to create unbalanced stresses in the top and bottom liners, a warped sheet tends to be the rule rather than the exception.

One culprit commonly contributing to unequal stress in the top and bottom liners, and therefore to warped sheets, is a different "cross-directional" moisture content profile remaining in the top liner as compared to that in the bottom liner after the three components have been bonded together. (The "cross-directions" are defined as the two directions in the plane of the sheet perpendicular to sheet movement through the corrugated paperboard sheet-making machine. The direction of sheet movement is called the "machine direction.") Different cross-directional moisture content profiles as between the two liners will result when, for example, machine direction streaks of higher than average moisture content are present within different opposing longitudinal segments of the top liner as compared to the bottom liner. (Such longitudinal segments are referred to as "slices.") Alternatively, different cross-directional moisture content profiles may also result when streaks of different moisture contents are present within corresponding opposing slices of the two liners.

Differences in cross-directional moisture content profiles between the two liners can occur quite readily for a variety of reasons. For example, the paper sheet used for the top liner may have been manufactured with faulty or inadequately controlled equipment which allowed moisture streaks to remain in the finished products, thereby causing the two liners to have different cross-directional moisture content profiles. Regardless of the reason, however, once top and bottom liners having unbalanced cross-directional moisture content profiles are bonded together with the corrugated medium, and the resulting corrugated paperboard sheet dries, cross-directional warpage can occur. This is because the respective cross-directional moisture content profiles of the liners affect cross-directional shrinkage that takes place in each liner during drying. Therefore, with uneven cross-directional shrinkage, the corrugated paperboard sheet may tend to curl into a long tube after it comes out of the corrugated sheet manufacturing machine.

Drying one liner or the other prior to bonding has been used in an attempt to prevent warping of the resulting board in the machine direction. Manufacturers have installed steam heated drying drums in certain corrugated paperboard sheet manufacturing machines. Prior to being bonded to the corrugated medium, the top and bottom liners are passed through separately controllable sets of these drying drums. The resulting corrugated sheet is watched, by eye, for any warping. Then, if the finished manufactured sheet curves upward toward the top liner, the steam supply is increased to the drying drums associated with the bottom liner, thereby decreasing the moisture content of this liner. Conversely, if the sheet curves toward the bottom liner, then the steam supply is increased to the drying drums associated with top liner, thereby decreasing the moisture content of the top liner. The goal is to obtain top and bottom liners having the same average moisture content. Unfortunately, however, differences in cross-directional moisture content profiles between the top and bottom liners cannot be corrected using steam-filled drying drums since such drums heat the liners equally across their entire widths.

Corrugated paperboard sheet manufacturers have also installed water spray nozzles on the corrugated paperboard manufacturing machines in an attempt to prevent, or at least minimize, warping of the resulting paperboard in the cross-direction. With this technique, a plurality of manually controlled water spray nozzles are disposed at intervals across each liner as the liners are being fed into the corrugated paperboard manufacturing machine. The machine operator then watches the paperboard as it is being produced and manually adjusts the pattern of water sprayed onto each liner from the nozzles in an attempt to flatten the resulting paperboard sheet. Unfortunately, however, this technique is time consuming even with a highly skilled and experienced operator. While the water spray pattern is being manually adjusted, large quantities of substandard, warped paperboard sheet may be produced. Also, unbalanced water content as between the two opposing liners is not the only factor which may produce warping. Thus, even if a skilled operator could produce an unwarped sheet, the water spray pattern necessary to produce such a sheet may mask other problems in the manufacturing process.

Finally, differences in moisture content between the top and bottom liners does not always warp the resulting corrugated paperboard sheet until sometime after the sheet is manufactured. Accordingly, large quantities of corrugated paperboard sheet may be manufactured before the unbalanced cross-direction and/or machine direction moisture content profiles become apparent through visually detectable warpage of the sheet.

SUMMARY OF THE INVENTION

The present invention provides for the measurement of the moisture content of both the top and bottom liners of corrugated paperboard sheet, on a slice-by-slice basis, prior to or after bonding to the corrugated medium. The present invention then controllably sprays water onto individual cross-directional slices of the liners, as needed, so that the liners have substantially the same moisture content profiles. The amount of water sprayed onto the liners at each slice is based upon the moisture measurements made during the corrugated sheet manufacturing process.

In one embodiment, this "remoisturization" of the liners is accomplished with two series of individually controllable water sprays called "remoisturizers." These remoisturizers are disposed adjacent to the top and bottom liners, respectively. The remoisturizers include water applicators having individually controllable valves and associated nozzles disposed at intervals along the cross-direction of each liner such that each nozzle can spray an individually controllable jet of water at a corresponding slice of the adjacent liner.

The present invention also preferably provides for the measurement of the respective cross-directional moisture content profiles of each individual liner, following bonding to the corrugated medium, as the corrugated sheet is drawn through the manufacturing machinery. Because the moisture measurements are preferably made at a point in the manufacturing process after the three components are bonded together, any alterations in the cross-directional moisture content profiles of the remoisturized liners due to the bonding process will be accounted for in the moisture measurements.

The results of the moisture measurements are used to control the remoisturizers on a slice-by-slice basis such that the cross-directional moisture content profiles of the two liners, at the end of the manufacturing process, are at the desired values. As previously mentioned, to prevent cross-directional warpage, it is generally desirable for the liners to have approximately the same cross-directional moisture content profiles at the end of the manufacturing process. Thus, each slice of the top liner should generally have the same moisture content as the directly opposing slice of the bottom liner. Similarly, control of the remoisturizers is also generally conducted to ensure that the liners have approximately the same machine direction moisture content profiles.

The apparatus and method of the present invention preferably provide for the measurement of the respective cross-directional moisture content profiles of the top and bottom liners individually, even though they have already been bonded together with the corrugated medium. According to the present invention, individual measurements of the cross-directional moisture content profiles of the top and bottom liners are obtained using, preferably, an infrared reflectance moisture measurement technique on the outer surfaces of the top and bottom liners.

Relatively heavy paper sheet is usually used for the liners (e.g., 200 g/m$^2$), and the liners will have a highly stratified moisture content throughout their thickness dimension after they are sprayed with water by the remoisturizers. However, infrared reflectance moisture sensors are typically preferentially sensitive to the moisture content of the paper material only near the surface of such liners (e.g., the outermost 35 g/m$^2$). Nevertheless, the heat from the double facer, and the resultant rise in temperature of the corrugated paperboard sheet, although intended simply to dry the glue, is believed to have another unintended and unexpected effect. The elevated temperature of the corrugated sheet is also believed to cause a rapid and even distribution of moisture throughout the thickness dimension of the liners very shortly after the corrugated paperboard sheet exits the double facer. A preferred embodiment of the present invention takes advantage of this rapid equalization in the previously stratified moisture content of the liners. Because of this rapid equalization of moisture content throughout the thickness dimension of the heated liners, accurate measurements of the average moisture content profile of each liner can be made according to the present invention by using infrared reflectance moisture sensors disposed on opposite sides of the manufactured corrugated paperboard sheet, even though such sensors are preferentially sensitive to moisture near the liner surface. That is, because of the rapid equalization of moisture in the liners caused by the elevated temperature, such infrared reflectance moisture sensors, although being preferentially sensitive to the moisture content near the outermost surface of each liner, nevertheless provide measurements that are representative of the average moisture content throughout the thickness of the liners. Since such moisture measurements are unexpectedly accurately indicative of the sheet moisture content, these measurements can be used to accurately control the remoisturizers according to the present invention to produce non-warped corrugated paperboard sheets having balanced moisture-induced stresses in the two opposing liners.

DETAILED DESCRIPTION OF THE DRAWINGS

Figure 1:
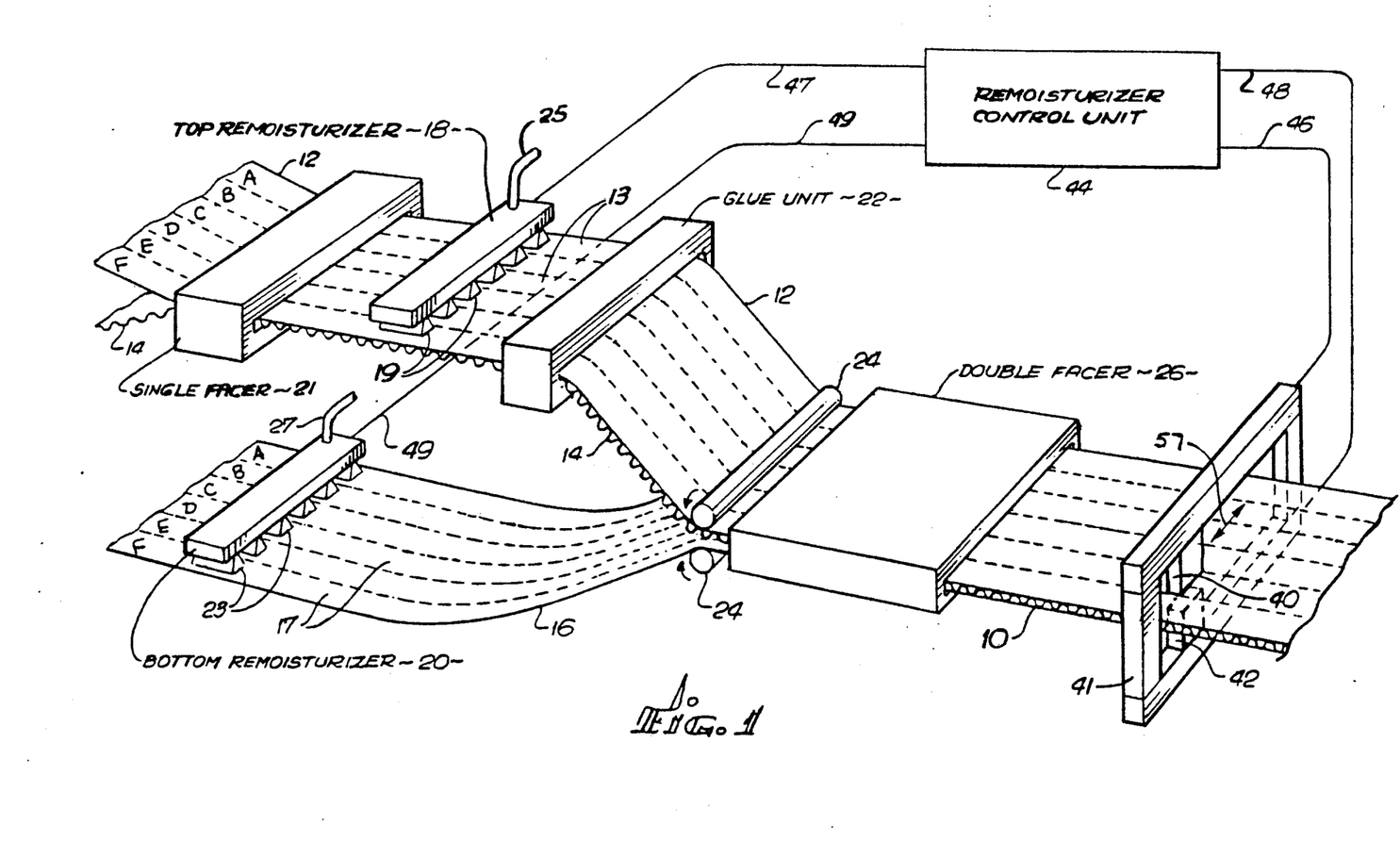
FIG. 1 is a perspective view of portions of a corrugated paperboard-making machine embodying a preferred form of the apparatus and method of the present invention.
Figure 2:
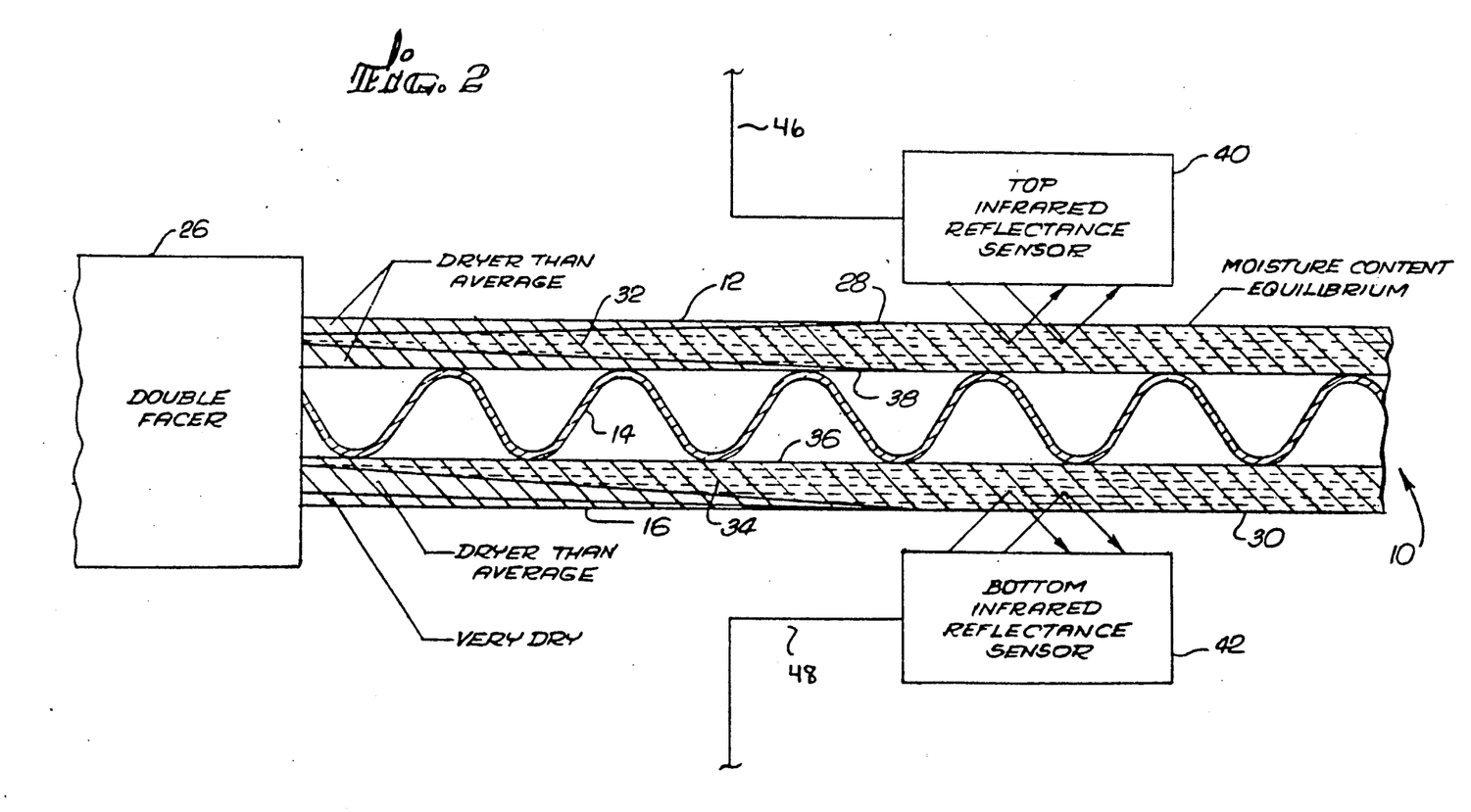
FIG. 2 is an enlarged, partially schematic, partially sectional view of remoisturized corrugated paperboard sheet exiting a double facer wherein it has been heated, and subsequently passes through infrared reflectance sensors, with its moisture content equalizing from a highly stratified state to a uniform state throughout the thickness dimension of the liners.

FIGS. 1 and 2 illustrate an apparatus and method of the present invention as used with a machine for producing corrugated paperboard sheet 10. Like numerals are used throughout for like elements in the various figures.

FIG. 1 illustrates portions of a machine for manufacturing corrugated paperboard sheet 10. Large rolls (not shown) containing the sheets of paper for the top liner 12, corrugated medium 14 and bottom liner 16 are mounted on individual roll stands (not shown). These rolls are unwound as the sheets are fed to the corrugated paperboard machine. In a portion of the process not illustrated in FIG. 1, the paper sheet forming the corrugated medium 14 is corrugated. This corrugated medium 14 is then glued to the top liner 12.

As shown in FIG. 1, after the corrugated medium 14 is glued to the top liner 12, the glue is dried in the elevated temperature of the single facer 21 and the top liner 12 may then be sprayed with water from the top remoisturizer 18. The top remoisturizer 18 has several separate water applicators 19, each including a nozzle and associated individually controllable valve (not shown) which allow the top remoisturizer 18 to selectively apply water to the individual slices 13 (designated A-F) of the top liner 12. (The dashed lines delineating adjacent slices A-F on the top and bottom liners 12, 16 would not, of course, be actually printed on the sheets, but are shown in FIG. 1 solely to assist in the explanation of the invention.) The bottom liner 16 may be similarly sprayed with water from the bottom remoisturizer 20. The bottom remoisturizer 20 also has several separate water applicators 23 which allow it to selectively apply water to the individual slices 17 of the bottom liner 16. The remoisturizers 18, 20 receive their water via conduits 25, 27 from a water source (not shown). A glue unit 22 then applies glue to the exposed surface of the corrugated medium 14. After the corrugated medium 14 and top liner 12 pass through the glue unit 22, the glued corrugated medium 14 with its top liner 12 and the bottom liner 16 are guided by rollers 24 into the double facer 26.

Several things happen within the double facer 26. The bottom liner 16 comes into pressurized physical contact with the underside of the corrugated medium 14 which previously had glue applied thereto by the glue unit 22. This results in the corrugated medium 14 and top liner 12 becoming glued to the bottom liner 16, thereby creating a unitary corrugated paperboard sheet 10. As previously mentioned, the double facer 26 is a heated chamber and therefore provides an environment therein having an elevated temperature. Heating the corrugated paperboard sheet 10 within the double facer 26 dries the glue, so that the three components 12, 14, 16 of the corrugated paperboard sheet 10 become firmly bonded together. Also, the heat from the double facer 26 dries out the exposed surfaces of the top and bottom liners 12, 16. Furthermore, the elevated temperature within the double facer 26 is believed to cause the stratified moisture within the top and bottom liners 12, 16 of the sheet 10 to equalize, spreading rapidly throughout the thickness dimension of the liners 12, 16.

FIG. 2 illustrates what the inventors believe is a typical moisture distribution throughout the thickness dimension of the top and bottom liners 12, 16 after the liners 12, 16 of the corrugated paperboard sheet 10 have been sprayed with water from the remoisturizers 18, 20 and transported through the double facer 26. While in the double facer 26, the stratified moisture in the heated liners 12, 16 begins to spread evenly throughout both liners 12, 16, except at the exposed outer surfaces 28, 30 of the liners 12, 16. Because the outer surfaces 28, 30 of the liners 12, 16 are directly exposed to the heat of the double facer 26, these surfaces 28, 30 tend to be dried out by evaporation relative to the internal portions 32, 34 of the liners 12, 16 and the inner surfaces 36, 38 of the liners 12, 16 facing the corrugated medium 14. However, immediately after the corrugated paperboard sheet 10 leaves the double facer 26, the corrugated sheet 10 is still at an elevated temperature and, therefore, the elevated temperature continues to rapidly equalize the moisture content of the liners 12, 16 throughout their thickness dimension until the moisture content of the liners 12, 16 near the exposed surfaces 28, 30 is the same as, or closely approximates, the average moisture content throughout the thickness of the liners 12, 16.

Shortly after the heated, remoisturized corrugated paperboard sheet 10 leaves the double facer 26, the sheet 10 passes through scanning infrared reflectance sensors 40, 42 which measure the cross-directional moisture content profiles of the liners 12, 16 for each slice 13, 17 at and near the exposed surfaces 28, 30 of the liners. The infrared reflectance sensors 40, 42 measure the cross-directional moisture content profiles of the liners 12, 16 as they are scanned back and forth along the cross-direction of the sheet 10, as illustrated by the arrows 57 in FIG. 1. (The device 41 for scanning sensors of various types back and forth along the cross-direction of a moving sheet is well known and, therefore, will not be further described herein.) Based upon the results of these moisture measurements, the remoisturizers 18, 20 are controlled to vary the amounts of water sprayed onto the respective slices 13, 17 of the liners 12, 16 via their water applicators 19, 23.

The remoisturizers 18, 20 are controlled by a computerized remoisturizer control unit 44 (FIG. 1). The remoisturizer control unit 44 receives signals from the infrared reflectance sensors 40, 42, via top and bottom moisture measurement data lines 46, 48. The signals on the top and bottom moisture measurement data lines 46, 48 are used to compute the moisture content profiles of the top and bottom liners. The computed moisture profiles for each of the liners are compared by the remoisturizer control unit 44. If the measured cross-directional moisture content profiles of the liners 12, 16 are not the same, on a slice-by-slice basis, then the remoisturizer control unit 44 instructs the remoisturizers 18, 20, via control lines 47, 49, to make the moisture profiles the same by spraying greater or lesser amounts of water onto the appropriate slices 13, 17. The remoisturizer control unit 44 is programmed to equalize or balance the moisture content profiles in the two liners. For example, one of the central slices "C" of the top liner 12 may contain a greater than average moisture content streak and the corresponding directly opposing slice "C" of the bottom liner 16 may have an average or less than average moisture content. In this situation, the remoisturizer control unit 44 is programmed to instruct the water applicator 23 adjacent slice "C" of the bottom liner 16 to spray that slice with enough water to equalize the moisture content in the "C" slices of the top and bottom liners. As previously explained, when the top and bottom liners have equal moisture content profiles, the stresses in the top and bottom liner will be balanced and, therefore, the corrugated sheet will not warp.

As previously mentioned, FIG. 2 illustrates, in a cross-sectional view of the corrugated sheet 10, the uniform spreading of the moisture throughout the thickness dimension of the paperboard liners 12, 16 immediately upon exit of the corrugated paperboard sheet 10 from the double facer 26. Initially, as the corrugated paperboard sheet 10 exits the double facer 26, it is believed that the moisture, although rapidly spreading throughout the heated liners 12, 16 as described above, is nevertheless still highly stratified. FIG. 2 further illustrates that the water sprayed from the remoisturizer 20 onto the inner surface 36 of the bottom liner 16 has spread only partially throughout the thickness of that liner 16 at the exit from the double facer 26. Similarly, the water sprayed by the top remoisturizer 18 has spread only partially through the thickness of the top liner 12. In addition, the direct exposure of the upper surface 28 of the top liner 12 and lower surface 30 of the bottom liner 16 to the heated air and/or heating coils (not shown) of the double facer 26 has evaporated the moisture from these exposed surfaces 28, 30. However, as the heated corrugated paperboard sheet 10 travels toward the infrared reflectance sensors 40, 42, the time spent in transit from the double facer 26 allows the moisture distribution to equalize throughout the thickness of the heated liners 12, 16. Thus, when the top infrared reflectance sensor 40 measures the cross-directional moisture content profile at the outer surface 28 of the top liner 12, it obtains an accurate indication of the average cross-directional moisture content profile throughout the thickness dimension of that liner 12. The same is true for the bottom liner 16, as measured by the bottom infrared reflectance sensor 42.

In a preferred embodiment, the corrugated paperboard sheet 10 is heated by the double facer 26 for approximately 8-12 seconds at approximately 95°-120° C., as the corrugated paperboard sheet 10 is drawn through the double facer 26 by the sheet processing machinery at 150 m/min-200 m/min. The corrugated paperboard sheet 10 then spends approximately 5-22 seconds at ambient room temperature while in transit from the double facer 26 to the infrared reflectance sensors 40, 42. The infrared reflectance sensors 40, 42 preferentially detect moisture to a depth of about 35 g/m$^2$. Even though each liner 12, 16 will typically have a basis weight of approximately 200 g/m$^2$, this shallow infrared measurement depth nevertheless provides an unexpectedly accurate moisture measurement in view of the fact that the heat from the double facer 26 has equalized the moisture distribution throughout the thickness dimension of the top and bottom liners 12, 16. Thus, this relatively shallow measurement depth produces an accurate indication of the average cross-directional moisture content profiles of the liners 12, 16.

Figure 3:
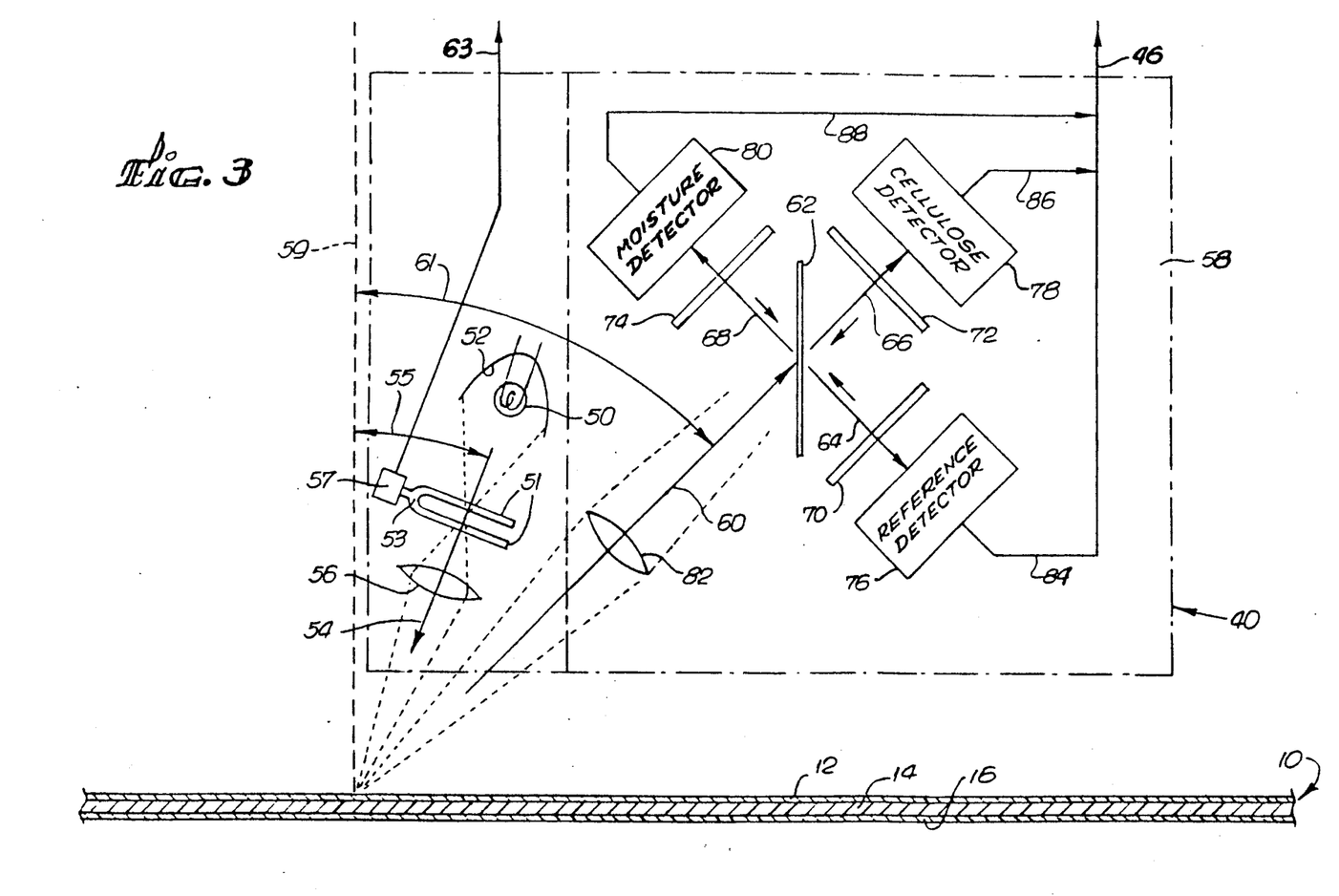
FIG. 3 is a schematic diagram of a preferred embodiment of the infrared reflectance sensor used in the present invention.

FIG. 3 illustrates, in schematic form, a cross-sectional view of the upper infrared reflectance sensor 40 with the corrugated paperboard sheet 10 beneath it. The sensor 40 includes an incandescent lamp 50 which is used as the infrared radiation source, and an eliptical reflector 52 which directs a beam of infrared radiation 54 from the source 50, through a focusing lens 56, toward the moving corrugated paperboard sheet 10.

In the presently illustrated preferred embodiment, the infrared sensor 40 also includes a receiver section 58 disposed on the same side of the sheet 10 as the infrared source 50 and which detects a reflected portion 60 of the incident infrared beam 54. The receiver section 58 of the sensor 40 includes a beam splitter 62 which splits the reflected infrared beam 60 into three separate beams 64, 66, 68. Each of these beams is directed at a separate band pass filter 70, 72, 74 positioned in the path of each of the beams 64, 66, 68 immediately before a detector (e.g., a lead sulfide detector) 76, 78, 80. Each filter 70, 72, 74 is selected and aligned relative to the respective incoming beams 64, 66, 68 so that each of these filters 70, 72, 74 passes infrared radiation in a separate region of the infrared spectrum. Infrared radiation not within the passbands of the various filters 70, 72, 74 is reflected by these filters 70, 72, 74 back to the beam splitter 62, and thus does not reach the associated detector 76, 78, 80. As a result, a single reflected beam 60 is directed from a focusing lens 82 to the beam splitter 62, and the combination of the beam splitter 62 and the filters 70, 72, 74 splits the single beam 60 into three separate beams 64, 66, 68, each to be detected by its own respective infrared detector 76, 78, 80.

The output signals 84, 86, 88 from each of the detectors 76, 78, 80 is indicative of the amount of infrared radiation being reflected from various portions of the corrugated paperboard sheet 10 within the passbands of the filters 70, 72, 74 associated with each detector 76, 78, 80. These signals 84, 86, 88 are sent as a group 46 of signals to the remoisturizer control unit 44 (FIG. 1) for controlling the remoisturizers 18, 20, as described earlier.

In certain situations, it may be preferred to modulate, at a known frequency, the amount of infrared radiation impinging upon the sheet 10 from the infrared source 50. This modulation may be accomplished by any one of several devices. For example, as illustrated in FIG. 3, the tines 51 of a tuning fork 53 may be disposed in the path of the infrared beam 54. The vibrating tines 51 modulate the infrared beam 54 as the tines 51 move alternately into and out of the path of the beam 54. Alternatively, an opaque disk (not shown), having a plurality of evenly spaced radial slots, may be rotated in the path of the beam 54 so that the beam 54 is alternately transmitted through the slots and blocked by the opaque portions of the disk. With either device, the beam 54 is modulated at a known frequency. Thus, the output of each infrared detector 76, 78, 80 is also sinusoidally modulated at the same known frequency as the incident infrared beam 54. Moreover, since the detector outputs are directly dependent upon the reflected portion 60 of the modulated incident beam 54, the phase of the detector outputs will be dependent upon the phase of the modulated beam 54. However, infrared energy originating from the corrugated paperboard sheet 10 and other external sources (not shown) will also reach the detectors 76, 78, 80. Thus, each detector signal 84, 86, 88 will include both an AC and DC component.

The outputs 84, 86, 88 of the three detectors 76, 78, 80 are transmitted along lines 46 to the remoisturizer control unit 44 (FIG. 1). The remoisturizer control unit 44 filters out the DC components of the detector signals, leaving filtered AC detector signals which are then passed through a phase synchronous demodulation circuit included within the remoisturizer control unit 44. The purpose of the phase synchronous demodulator is to filter out changes in the detector signals which are not caused by the varying infrared absorption of the liner 12. For example, 60Hz line noise in the detector signals 84, 86, 88 is filtered out by the demodulator circuit, as explained below.

A sine wave oscillator 57 is used to drive the tines 51 of the tuning fork 53 at the resonant frequency of the tuning fork 53. The output of this sine wave oscillator 57, in addition to driving the tuning fork 53, is also transmitted along a line 63 to the remoisturizer control unit 44 which converts the sine wave to a square wave having the same phase as the output signals 84, 86, 88 from the infrared detectors 76, 78, 80. This square wave is then fed to the phase synchronous demodulator portion of the remoisturizer control unit 44 along with the AC filtered signals from each of the three infrared detector 76, 78, 80. The signals 84, 86, 88 from the infrared detectors 76, 78, 80 are, of course, modulated at the same frequency as the output of the tuning fork oscillator 57. Hence, by demodulating the outputs 84, 86, 88 from each of the detectors 76, 78, 80 with a square wave having the same frequency and phase, and then averaging the demodulated outputs over a number of cycles, changes in the detector signals 84, 86, 88 which result from changes in the intensity of external infrared sources, or extraneous signals such as 60Hz line voltage, are removed from the moisture measurement. Changes in the intensity of the infrared energy reaching the detectors 76, 78, 80 from other external sources or 60 Hz line noise from the power supply could produce erroneous moisture measurements.

As described above, the DC filter, sine wave to square wave converter and phase synchronous demodulation circuits may be located in the control unit 44. Alternatively, however, the DC filter, sine wave to square wave converter and phase synchronous demodulation circuits may be located in the sensor itself.

In either event, the averaged amplitude of the demodulated signals from each detector 76, 78, 80 is indicative of the amount of infrared source radiation being reflected from various portions of the liner 12 within the passbands of the filters 70, 72, 74 associated with each respective detector 76, 78, 80. The amplitudes of these amplitude averaged and demodulated detector signals are then measured by the remoisturizer control unit 44, which then computes the moisture within the liner 12 utilizing the equations and techniques more fully described below.

Figure 4:
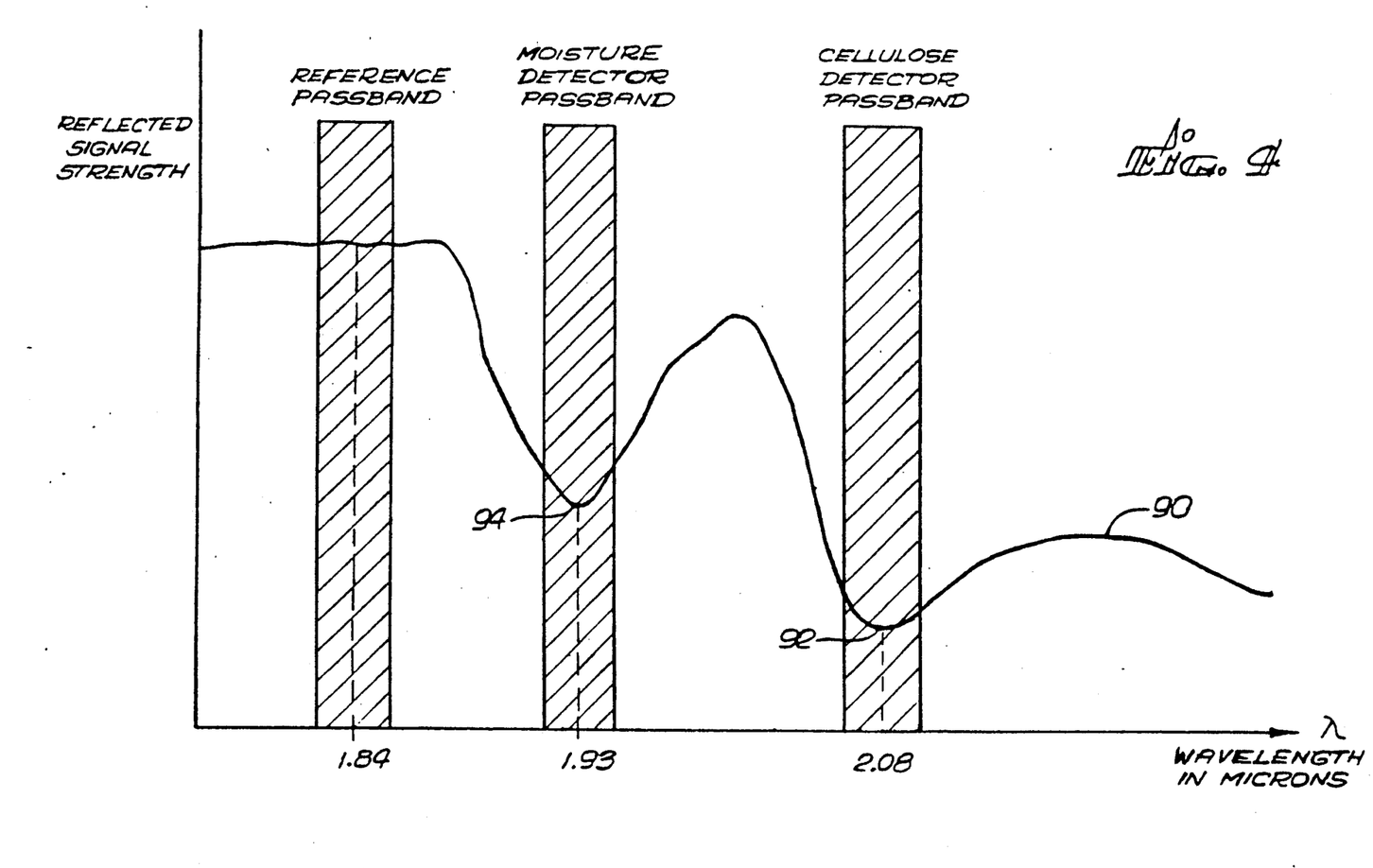
FIG. 4 illustrates an infrared reflectance spectrum for a corrugated paperboard liner.

FIG. 4 illustrates an infrared reflectance spectrum 90 for a corrugated paperboard sheet 10 and the passbands for the reference 70, cellulose 72 and moisture 74 filters associated, respectively, with the reference 76, cellulose 78 and moisture 80 infrared detectors. The reference bandpass filter 70 is chosen such that the amount of absorption by the liner 12 of infrared radiation within its passband is indicative of the total mass of the various materials forming the irradiated portion of the liner 12. Thus, the amplitude of the reference signal is also indicative of the total basis weight (i.e., the weight per unit area) of the irradiated portion of the liner 12. The cellulose bandpass filter 72 is chosen such that its passband is located on or centered about an absorption peak 92 for cellulose. Thus, the cellulose signal is primarily indicative of the mass of cellulose fibers forming the sheet, and is relatively unaffected by changes in the amounts of other sheet components. Similarly, the moisture bandpass filter 74 is chosen such that its passband is located on or centered about an absorption peak 94 for water, so that the moisture signal is primarily indicative of the amount of water in the sheet and is substantially insensitive to the amounts of other sheet components.

Infrared bandpass filters, well known in the art, may be made by coating a quartz substrate with a dielectric coating. The thickness of the dielectric coating determines the center of the passband for the filter. Accordingly, by varying the thickness of the dielectric coating, a filter can be made to have a passband at any desired region of the infrared spectrum.

The preferred center wavelength for the passbands of the reference 70, cellulose 72 and moisture 74 bandpass filters are 1.84 microns, 2.08 microns and 1.93 microns, respectively. The bandwidth for each of these filters is preferably approximately 0.04 microns, but may be wider or narrower as needed to obtain the desired signal strength from the detectors 76, 78, 80.

As illustrated in FIG. 3, the infrared reflectance sensor 40 directs a beam 54 of infrared radiation toward the corrugated paperboard sheet 10 at an angle 55 from the normal 59 to the surface of the upper liner 12. To avoid strong reflections of infrared radiation from the surface of the liner 12, the receiver section 58 of the sensor 40 is preferably constructed to detect infrared radiation reflected from the liner 12 at a reflection angle 61 from the same side of the normal 59 as the infrared source 50. In a preferred embodiment of the present invention, the incident angle 55 would be approximately 10°, and the reflection angle 61 would be approximately 20°.

The moisture content of a slice 13 within the liner 12 is preferably made according to the following equations:

$$R_1 = \frac{I_{REF}}{I_{MOIS}}$$

$$R_2 = \frac{I_{REF}}{I_{CELL}}$$

$$BW_{MOIS} = A(R_1 - 1)$$

$$BW_{CELL} = B(R_2 - 1)$$

$$M = \frac{A(R_1 - 1)}{B(R_2 - 1)} + C(R_2 - 1) + D$$

Where:

$I_{REF}$ is the amplitude of the reference signal 84 from the reference detector 76 indicative of the amount of infrared energy detected by the reference detector 76;

$I_{MOIS}$ is the amplitude of the moisture signal 88 from the moisture detector 80 indicative of the amount of infrared energy detected by the moisture detector 80;

$I_{CELL}$ is the amplitude of the cellulose signal 86 from the cellulose detector 78 indicative of the amount of infrared energy detected by the cellulose detector 78;

$BW_{MOIS}$ = basis weight of moisture (i.e., mass of water per unit sheet surface area) in the irradiated portion of the liner;

$BW_{CELL}$ = basis weight of cellulose in the irradiated portion of the liner; and A, B, C and D are empirically determined constants which relate measured infrared energy to the amount of moisture and cellulose in the liners. These constants may be determined using well known curve fitting techniques.

M = the ratio of moisture to total liner basis weight, assuming, as is typically true, that the basis weight of moisture is much less than the basis weight of cellulose (i.e., assuming $BW_{MOIS} << BW_{CELL}$).

The above calculations may be performed within the remoisturizer control unit 44, a dedicated computer (not shown) or the process control computer (not shown) which is present in most modern automated paper mills. Following these computations, the remoisturizer control unit 44 controls the slice-by-slice application of water to the liners 12, 16 by the water applicators 19, 23 of the remoisturizers 18, 20, to ensure that both liners have substantially the same cross-direction moisture content profiles.

As can be seen from the above equations, the measurements of infrared radiation by the moisture-sensitive and cellulose-sensitive detectors, 80 and 78, respectively, are normalized against the measurement by the reference detector 76, thereby compensating for actual and apparent variations in the basis weight of the liners 12, 16. Variations in the actual basis weights of the liners 12, 16 occur primarily because the liners 12, 16 are not made with exactly uniform amounts of pulp fiber material across the length and width of the sheet. Also, although most of the infrared radiation reflected from the liners 12, 16 to the receiver section 58 of the infrared sensor 40 will have been reflected by the outer portions of the liners 12, 16, some detected infrared radiation will nevertheless have reached the corrugated medium 14. However, variations in the periodicity of the corrugations, or the length of corrugated medium bonded to the liners 12, 16 at each undulation of the medium 14 will change the amount of paper material encountered by the detected infrared radiation and, therefore, make the basis weight of the liners 12, 16 appear to change. Nevertheless, because the signals from the moisture-sensitive and cellulose-sensitive detectors are normalized against the reference detector signal, accurate measurement of the cross-directional moisture content profiles of the liners can be made according to the present invention, regardless of actual and apparent changes in the basis weight of the liners 12, 16.

The accuracy of the moisture measurement is further enhanced because the moisture, M, is computed as a ratio of the two ratios, $R_1$ and $R_2$. Optical properties of the sheet and sensor optics which affect $R_1$ will similarly affect $R_2$. Thus, such affects will be substantially cancelled out in the computation of M, thereby further increasing the accuracy of the moisture calculation.

The term $C(R_2-1)$ may be omitted from the computation of the value for M when the grade of liner being used in the manufacture of the corrugated sheet remains constant. However, when a liner grade change occurs during the manufacturing process, there may be a dramatic change in the cellulose basis weight. The term $C(R_2-1)$ is included in the computation to compensate for such large changes in cellulose basis weight, thereby still further increasing the accuracy of the present moisture measurement.

From the above discussion it will be apparent to those skilled in the art that by selectively spraying water onto one surface of each of the top and bottom liners 12, 16, applying heat thereto within a double facer 26, and allowing time for the moisture to spread uniformly through the thickness dimension of the liners before being measured by the three-channel infrared reflectance moisture sensors 40, 42, accurate indications of the average cross-directional moisture content profiles of the individual liners 12, 16 can be obtained with infrared reflectance near-surface moisture measurement techniques, regardless of the changing basis weights of the liners 12, 16. The results of these measurements, when used in the above closed loop system, provide the needed information for controlling the slice-wise remoisturization of the liners 12, 16, to provide nearly equal moisture content in corresponding slices in the top and bottom liners, thereby resulting in a non-warped corrugated paperboard sheet 10.

As will be readily apparent from the above discussion, by repeatedly computing the cross-directional moisture content on a slice-by-slice basis (e.g., during each scan of the infrared sensors across the sheet) and repeatedly and independently adjusting the water output of the sprays 19, 23 to equalize the cross-directional moisture profile of the top and bottom liners, the present invention can control curl or warping of the corrugated sheet in the cross-direction, thereby providing a flat corrugated paperboard sheet.

The present invention can also be used in a mode to control machine-direction warping of the corrugated paperboard sheet 10. According to one embodiment of this aspect of the present invention, the remoisturizer control unit 44 computes the moisture content of the top and bottom liners 12, 16, averaged across the entire width of each liner following each scan of the infrared reflectance sensors, 40, 42 across the sheet 10. Then, the remoisturizer control unit 44 instructs all of the water applicators 19, 23, for the remoisturizer 18, 20 associated with the drier liner to apply a uniform amount of water across the entire width of the drier liner, such that the average moisture content of both liners, 12, 16, are equalized.

In yet another mode of operation of the present invention, the two previously discussed modes of operation are combined, so as to simultaneously control both the cross-direction and machine-direction warp of the sheet 10. According to this aspect of the invention, the remoisturizer control unit 44 computes the average moisture content of the top and bottom liners 12, 16, across the entire width of the sheet 10 and the moisture content of each slice of both liners 12, 16. The remoisturizer control unit 44 then controls the amount of water sprayed by the water applicators 19, 23, onto each liner, 12, 16, so that both liners 12, 16 have substantially the same cross-directional moisture profiles and also so that both liners 12, 16, have the same moisture content when averaged across the entire width of the sheet 10. For example, suppose that the upper liner 12 is drier than the lower liner 16 when their moisture contents are averaged across the entire width of the sheet 10. At the same time, the lower liner 16 has a streak of unusually high moisture content in slice "E". In this situation, the remoisturizer control unit 44 will first compute how much additional water must be added to the upper liner 12 to equalize the average moisture content of both liners 12, 16. The remoisturizer control unit 44 will then instruct the top remoisturizer 18 to spray a certain fraction of this additional water onto slice "E" of the upper liner 12, as needed to produce a moisture streak in the "E" slice of the upper liner 12 having the same moisture content as the corresponding streak in the "E" slice of the lower liner 16. The remaining amount of additional water needed to produce equal average moisture content for the top and bottom liners, 12, 16 is then sprayed equally across the remaining slices of the top liner 12.

Many other modes of operation to equalize the moisture content profiles of the top and bottom liners will be apparent to those skilled in the art.

As will also be readily apparent to those skilled in the art, several portions of the apparatus and method heretofore described may be modified without affecting the basic functions of the present invention. By way of example only, the water sprayed from the bottom remoisturizer 20 may be directed at either the inner 36 or outer 30 surfaces of the bottom liner 16, the glue unit 22 may precede the top remoisturizer 18, rather than following it as shown in FIG. 1, and the level of heat applied within the double facer 26 and/or the time duration thereof, may be varied in conjunction with the speed of the paperboard sheet 10 through the corrugating machine, to achieve the desired equalized cross-directional moisture content profiles throughout the thicknesses of the liners. By way of further example, simpler single- or two-channel infrared reflectance moisture sensors may be used where the basis weights of the liners 12, 16 will not vary significantly or may be compensated for in some other manner. Also, other means for determining moisture content may be used. Moreover, although the remoisturizer control unit will usually be programmed to create mutually balanced moisture content profiles in the two liners 12, 16, the invention also includes within its scope control of the remoisturizers 18, 20 so that the liners 12, 16 will have unbalanced cross-directional moisture content profiles. Furthermore, the invention may be used with sheet materials other than corrugated paperboard sheet. Accordingly, the above-described embodiments are to be considered is illustrative only, and not restrictive. The scope of the invention is indicated by the appended claims rather than the foregoing description. All variations which come within the meaning and range of equivalents of these claims are intended to be embraced therein.

What is claimed is:

1. In a method for continuously fabricating substantially warp-free corrugated paperboard sheet comprising a top liner, a corrugated medium and a bottom liner, the steps comprising:

joining the top liner and the corrugated medium;
   applying controlled amounts of water to the top liner after it has been joined with the corrugated medium;
   applying controlled amounts of water to the bottom liner;
   bonding the bottom liner to the corrugated medium to form the corrugated paperboard sheet;
   independently sensing the moisture content of the top and bottom liners of the corrugated paperboard sheet after bonding; and
   independently controlling the amounts of water applied to the top and bottom liners before bonding in response to the sensed moisture contents of said liners.

2. The method of claim 1, further comprising the step of:

heating the paperboard sheet as part of the step of bonding the bottom liner to the corrugated medium;
   and in which:
   the moisture contents of the top and bottom liners are sensed after a sufficient lapse of time following heating of the paperboard sheet to permit the applied water to attain a substantially uniform concentration throughout the thickness dimensions of the top and bottom liners.

3. The method of claim 1, wherein the application of water to the liners is controlled such that, after applying the water, the moisture content profiles of the top and bottom liners are substantially the same.

4. The method of claim 1 in which the moisture contents of the top and bottom liners are sensed at a plurality of different correspondingly opposed locations across the liners and the controlling step includes independently controlling the amounts of water applied at each of the plural locations based upon the moisture contents sensed at each of the locations.

5. The method of claim 4, in which the application of water to each of the locations is controlled so that, after applying the water, the moisture content of the top liner at each location is substantially equal to the moisture content of the bottom liner at each correspondingly opposed location.

6. In a method for continuously fabricating substantially warp-free corrugated paperboard sheet comprising a top liner, a corrugated medium and a bottom liner, the sheet having a machine direction and a cross direction transverse of the machine direction, the steps comprising:

forming the corrugated paperboard sheet from the top and bottom liners and corrugated medium;
   independently sensing the moisture content profiles of the top and bottom liners after the formation of the corrugated paperboard sheet; and
   controlling the cross direction moisture content of one liner relative to the other liner before the formation of the corrugated paperboard sheet in response to the sensed moisture content profiles to substantially equalize the moisture content profiles of the top and bottom liners.

7. The method of claim 6, further including the step of:

heating the liners during the formation of the corrugated paperboard sheet;
   and in which:
   the moisture content profiles of the top and bottom liners are sensed after a sufficient lapse of time following said heating to permit the moisture in said liners to attain a substantially uniform concentration throughout the thickness dimensions of said liners.

8. In a method for continuously fabricating substantially warp-free corrugated paperboard sheet comprising a top liner, a corrugated medium and a bottom liner, the steps comprising:

joining the top liner and the corrugated medium;
   applying controlled amounts of water to the top liner after it has been joined with the corrugated medium;
   applying controlled amounts of water to the bottom liner;
   bonding the bottom liner to the corrugated medium to form the corrugated paperboard sheet and heating the paperboard sheet as part of the bonding step;
   independently sensing the moisture contents of the top and bottom liners of the corrugated paperboard sheet after a sufficient lapse of time following heating of the paperboard sheet to permit the applied water to attain a substantially uniform concentration throughout the thickness dimensions of the top and bottom liners; and
   independently controlling the amounts of water applied to the top and bottom liners in response to the sensed moisture contents of said liners.

9. A system for producing non-warped corrugated paperboard sheet made from first and second opposing outer liners and a central corrugated medium, the system comprising:

means for providing first and second liners;
   means for providing a corrugated medium;
   a bonding system operable to bond the first and second liners to opposite sides of the corrugated medium to form a unified corrugated paperboard sheet;
   a plurality of individually controllable water applicators disposed adjacent to the first and second liners and adapted to apply water onto the liners at a plurality of cross-directional locations before the corrugated paperboard sheet is formed by the bonding system;

moisture sensors spaced from the water applicators, the sensors being adapted to measure the moisture content of each of the liners at the plurality of cross-directional locations after the application of water and after the corrugated paperboard sheet is formed by the bonding system;

transport means for transporting the liners and corrugated medium from the bonding system and water applicators to the moisture sensors; and control means, operatively coupled to the moisture sensors and to the water applicators, for independently controlling the application of water by the applicators to the plural cross-directional locations of the first and second liners based upon the moisture measurements of the moisture sensors at the plural cross-directional locations.

10. A system as in claim 9, wherein the control means includes a computer programmed to control the application of water to the liners by the applicators such that the first and second liners have approximately equal cross-directional moisture content profiles.

11. A system as in claim 10, wherein the computer is further programmed to control the application of water by the applicators such that the first and second liners have approximately equal machine direction moisture content profiles.

12. A system as in claim 9, wherein the moisture sensors are infrared reflectance sensors.

13. A system as in claim 12, wherein at least one of the infrared reflectance sensors is a 3-channel sensor, the first channel being primarily responsive to the liner cellulose content, the second channel being primarily responsive to the liner moisture content and the third channel being primarily responsive to the liner basis weight.

14. A system as in claim 13, wherein the first channel is primarily responsive to infrared radiation in the vicinity of 2.08 microns, the second channel is primarily responsive to infrared radiation in the vicinity of 1.93 microns and the third channel is primarily responsive to infrared radiation in the vicinity of 1.84 microns.

15. In a system for fabricating corrugated paperboard sheet comprising first and second opposing outer liners and a central corrugated medium, apparatus for controlling the moisture content of said liners comprising:

means for applying independently variable amounts of water to the first and second liners;

means for sensing the moisture contents of the first and second liners after the water has been applied to the liners, said moisture content sensing means having outputs indicative of said moisture contents;

means responsive to the outputs of the moisture content sensing means for controlling the amounts of water applied to the first and second liners;

a paperboard sheet heating device for bonding the liners and the corrugated medium to form the corrugated paperboard sheet; and means for transporting the sheet from the heating device to the moisture content sensing means, said means for applying water being positioned upstream of the heating device so that water is applied to the liners before bonding, and said sensing means being disposed at a distance downstream from the heating device such that the time for transporting the sheet from the heating device to the sensing means is sufficient to permit water in the first and second liners to substantially equalize in concentration throughout the respective thickness dimensions of the liners.

16. An apparatus in accordance with claim 15, wherein the moisture content sensing means are adapted to sense the moisture content of the liners at various cross-directional slice positions, the water applying means including nozzles disposed to apply independently variable amounts of water at each of the cross-directional slice positions, and the controlling means being adapted to selectively vary the independently variable amounts of water applied by each nozzle based upon the moisture content sensed at each slice position.

17. An apparatus, as set forth in claim 15, wherein the water controlling means is operable to control the amount of water applied to the first and second liners such that the moisture content profiles of the first and second liners are substantially the same.

18. An apparatus as set forth in claim 16, in which the water controlling means is operable to control the application of water by the nozzles such that the cross-directional moisture content profiles of the first and second liners are substantially the same.

* * * * *